G. JACKSON.
ATTACHMENT FOR VEHICLE SEATS.
APPLICATION FILED NOV. 3, 1913.
1,103,145.
Patented July 14, 1914.
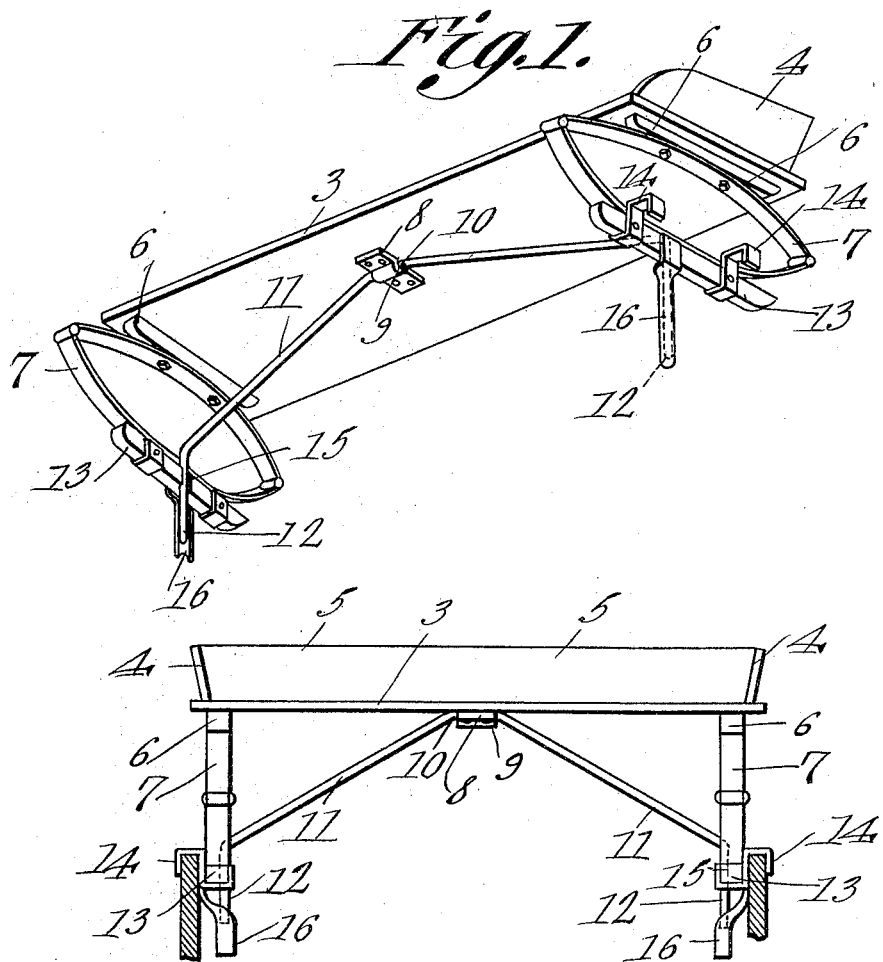

UNITED STATES PATENT OFFICE.

GEORGE JACKSON, OF POTTSBORO, TEXAS, ASSIGNOR OF ONE-FOURTH TO JOHN JACKSON, OF POTTSBORO, TEXAS.

ATTACHMENT FOR VEHICLE-SEATS.

1,103,145.

Specification of Letters Patent. Patented July 14, 1914.

Application filed November 3, 1913. Serial No. 798,981.

*To all whom it may concern:*

Be it known that I, GEORGE JACKSON, a citizen of the United States, residing at Pottsboro, in the county of Grayson and State of Texas, have invented a new and useful Attachment for Vehicle-Seats, of which the following is a specification.

This invention relates to an attachment for a vehicle seat and more particularly to a device securable to the under portion of a seat and engaging the side walls of the wagon body so that the seat will be prevented from shifting transversely of the vehicle.

A further object is to provide an attachment for vehicle seats which will prevent undue transverse stress being brought to bear upon the elliptical suspension springs of the seat.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in perspective of a vehicle seat taken from beneath and with my improved attachment secured thereto. Fig. 2 is a front view in elevation thereof.

Referring to the drawings in which similar reference numerals designate corresponding parts throughout the several views, 3 is the seat to which are secured the usual sides 4 and the back 5. The seat construction includes the under bars 6 and elliptical springs 7 which are of the conventional type such as are found in use in connection with farm wagons and allied vehicles.

Rigidly secured to the under and central portion of the seat 3 is the bearing and attaching member 8, the same being provided with the transverse channel 9 extending thereacross and which channel is adapted to rotatably receive the rod 10 therethrough. The rod 10 is formed of a single length of material and is inserted at its central portion in the channel 9 of the bearing and attaching member 8. At the points adjacent the edges of the bearing and attaching member the rod 10 is bent downwardly to form the outwardly and downwardly converging arms 11 and which arms terminate in the downwardly extending guide rods 12. The guide rods 12, arms 11 and central portion of the rod 10 are all formed of some material of considerable strength so that there will be little or no give to the rod which would allow the seat to move transversely of the vehicle and shift along its own longitudinal axis.

Rigidly secured to the under portions of the elliptical springs 7 are the attaching strips 13 each of which is provided with a number of the overhanging flanged members 14 which are adapted to engage the side walls of the vehicle body to hold the elliptical spring and seat thereto substantially as illustrated in Fig. 2. The attaching strips 13 are provided with the grooves 15 extending along their inner faces and through which the guide rods 12 extend.

Rigidly secured to and projecting downwardly from the attaching strips 13 are what is termed the guide sleeves 16 which receive the guide rods 12 therein and limit the same to rectilinear motion which when the various parts are in operable relation and position upon a vehicle body will be a rectilinear motion in a substantially vertical plane.

The many advantages accruing from a construction as herein set forth will be apparent to those familiar with seats of farm wagons. The many advantages of the elliptical spring has resulted in its almost universal adoption. However, much difficulty has been experienced with seats so supported because of the breaking of the springs and the short life of the seat, largely due to the rough usage accorded to seats of this class, the seat being constantly shaken transversely of the wagon body, which brings a transverse stress upon the seat and supporting springs. With the device as herein disclosed, the seat will be positively prevented from shifting laterally or transversely of the wagon body due to the arms 11 and guide rods 12 holding the seat against motion in a transverse plane. However, it is to be noted that by reason of the bearing member 8 and the manner in which the rod 10 is secured and formed, it will not in any way modify the natural resiliency of the spring or impede the movements thereof. Also attention is called to the fact that if the weight of a single person be imposed upon the seat at one end thereof, the guide rods and arms will prevent the seat from sagging down at one end with the corresponding uncomfortable result. By reason of the fact that the rod 10 is rotatably secured to the under surface of the seat, allows the rod to be folded up against the seat when not in use.

Having thus fully described my invention, what I claim is:—

1. An attachment for a wagon seat comprising a rod bent at its central portion to define downwardly diverging arms, the said arms bent abruptly downward at their outer extremities to form guide rods, guide sleeves carried by the wagon engaging portion of the wagon seat and means rotatably engaging the central portion of the said rod adapted to engage the seat to thereby prevent the shifting of the seat transversely with respect to the wagon engaging portion of the wagon seat.

2. In a device of the class described, the combination of a bearing member attachable to the under surface of a wagon seat, a brace member including a central portion and diverging arms, said central portion rotatably held by said bearing member, the said arms diverging from a substantially central point, guide rods carried by the extremities of the said arms, and a pair of guide sleeves adapted to receive the said guide rods therein to limit the said guide rods to rectilinear motion, the said guide sleeves supported by the wagon engaging portion of the wagon seat.

3. An attachment for wagon seats comprising a rod bent at its central portion to define downwardly diverging arms, a bearing member rigidly secured to the wagon seat and rotatably engaging said rod, guide sleeves carried by the wagon engaging portion of the wagon seat and held stationary with respect thereto, the said rod and guide sleeves limiting the movement of the wagon seat to a vertical plane through said bearing, said rotatable engagement of the rod providing for the tilting of said seat about the bearing as an axis.

4. The combination with a wagon seat with springs secured thereto, of means carried by said springs for engaging a wagon body, a bearing member secured to the wagon seat, a rod rotatably carried by said bearing member and provided with downwardly extending outstanding arms, guide sleeves secured to the wagon engaging portion of the said springs, said guide sleeves slidably engaging the said outstanding arms and limiting the movement of the wagon seat to a vertical plane through said bearing, said rotatable engagement of the rod providing for the tilting of the seat about the bearing as an axis.

In testimony that I claim the foregoing as my own, I have hereto affixed my signature in the presence of two witnesses.

GEORGE JACKSON.

Witnesses:
 GEO. B. ANDERSON,
 W. E. BAIRD.